Figure 1:
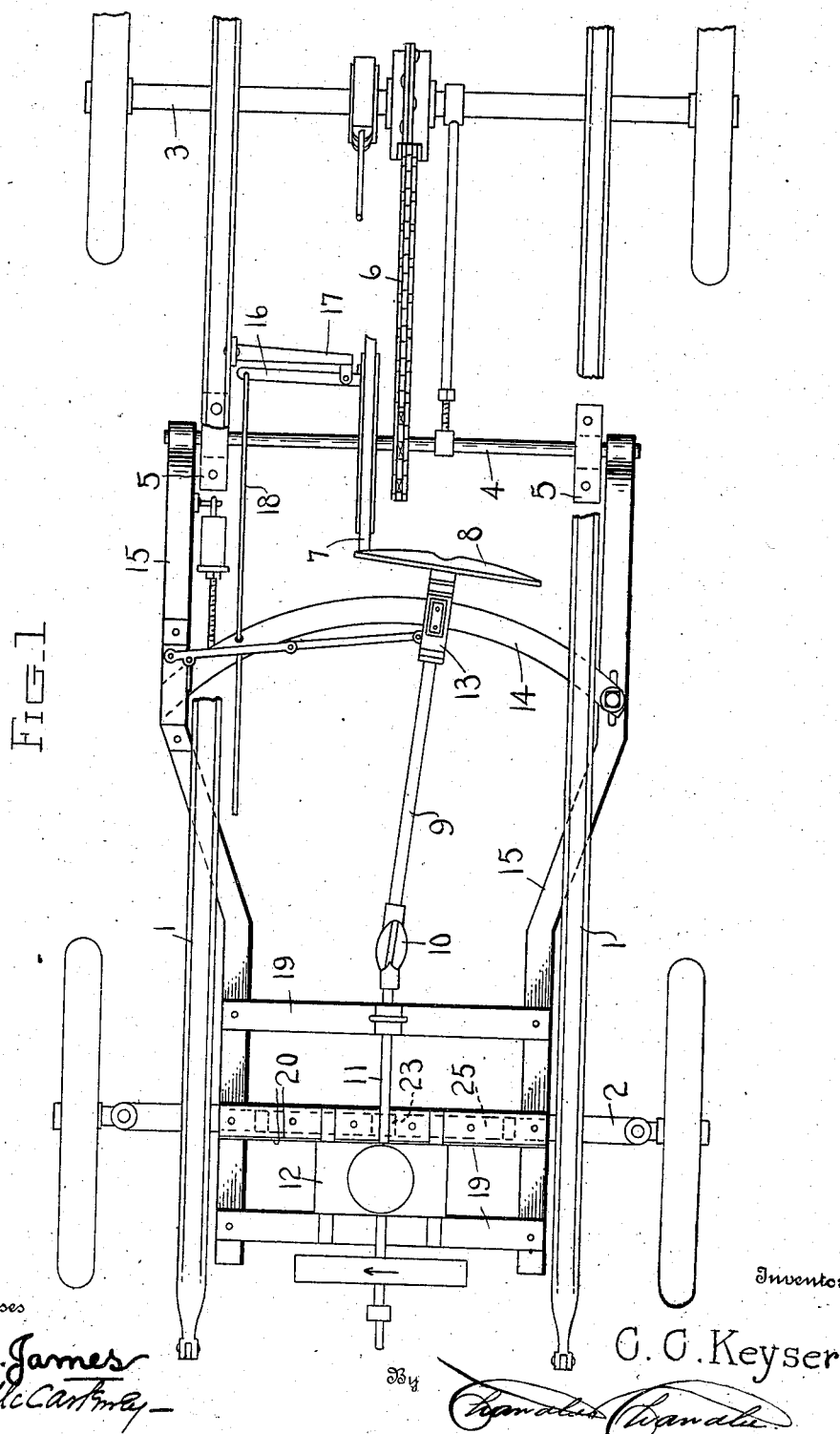

No. 881,696. PATENTED MAR. 10, 1908.
C. C. KEYSER.
AUTOMOBILE RUNNING GEAR.
APPLICATION FILED DEC. 13, 1907.

3 SHEETS—SHEET 1.

Witnesses
L. B. James
N. C. McCartney

Inventor
C. C. Keyser
By Chandler Chandler
Attorneys

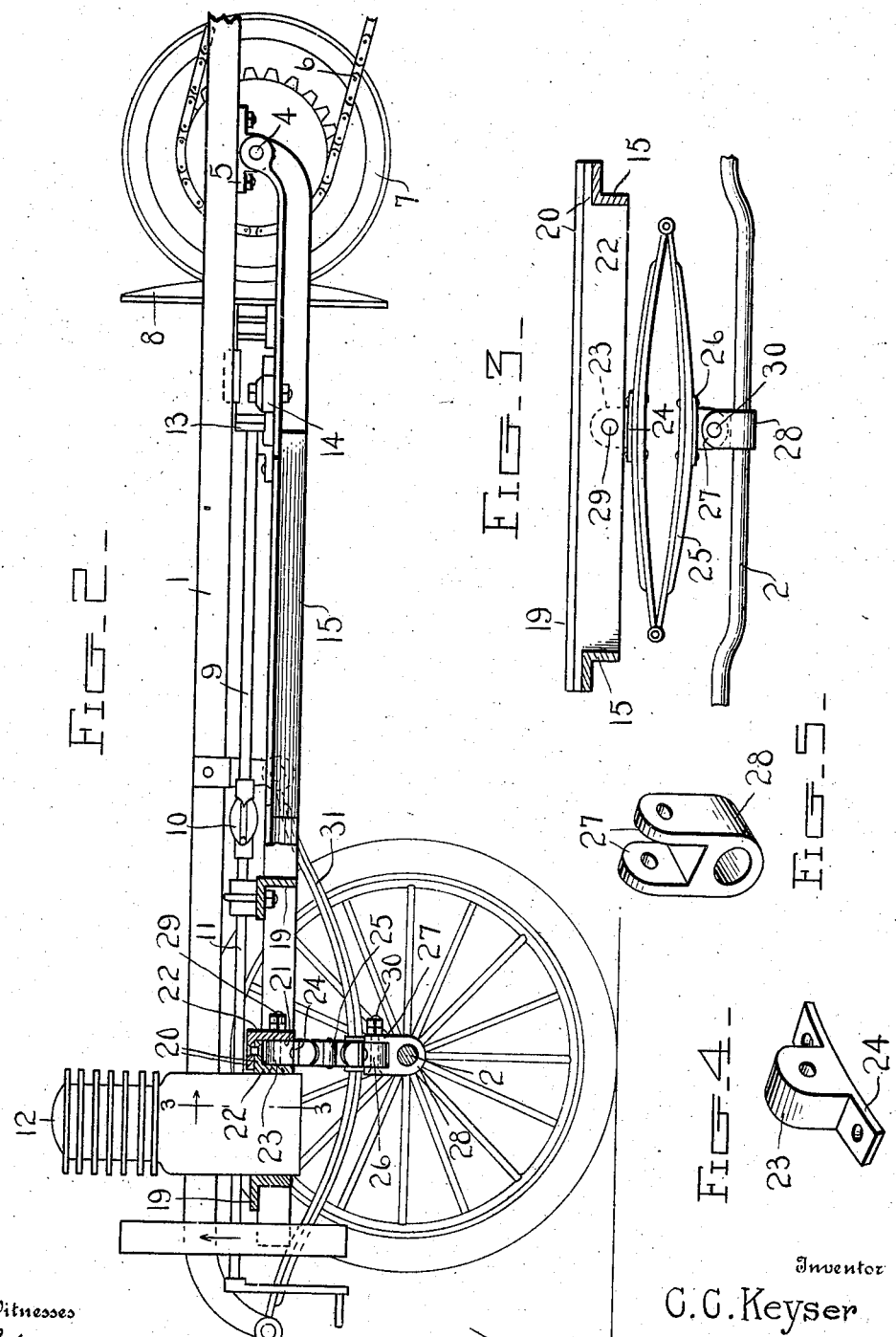

No. 881,696. PATENTED MAR. 10, 1908.
C. C. KEYSER.
AUTOMOBILE RUNNING GEAR.
APPLICATION FILED DEC. 13, 1907.
3 SHEETS—SHEET 3.
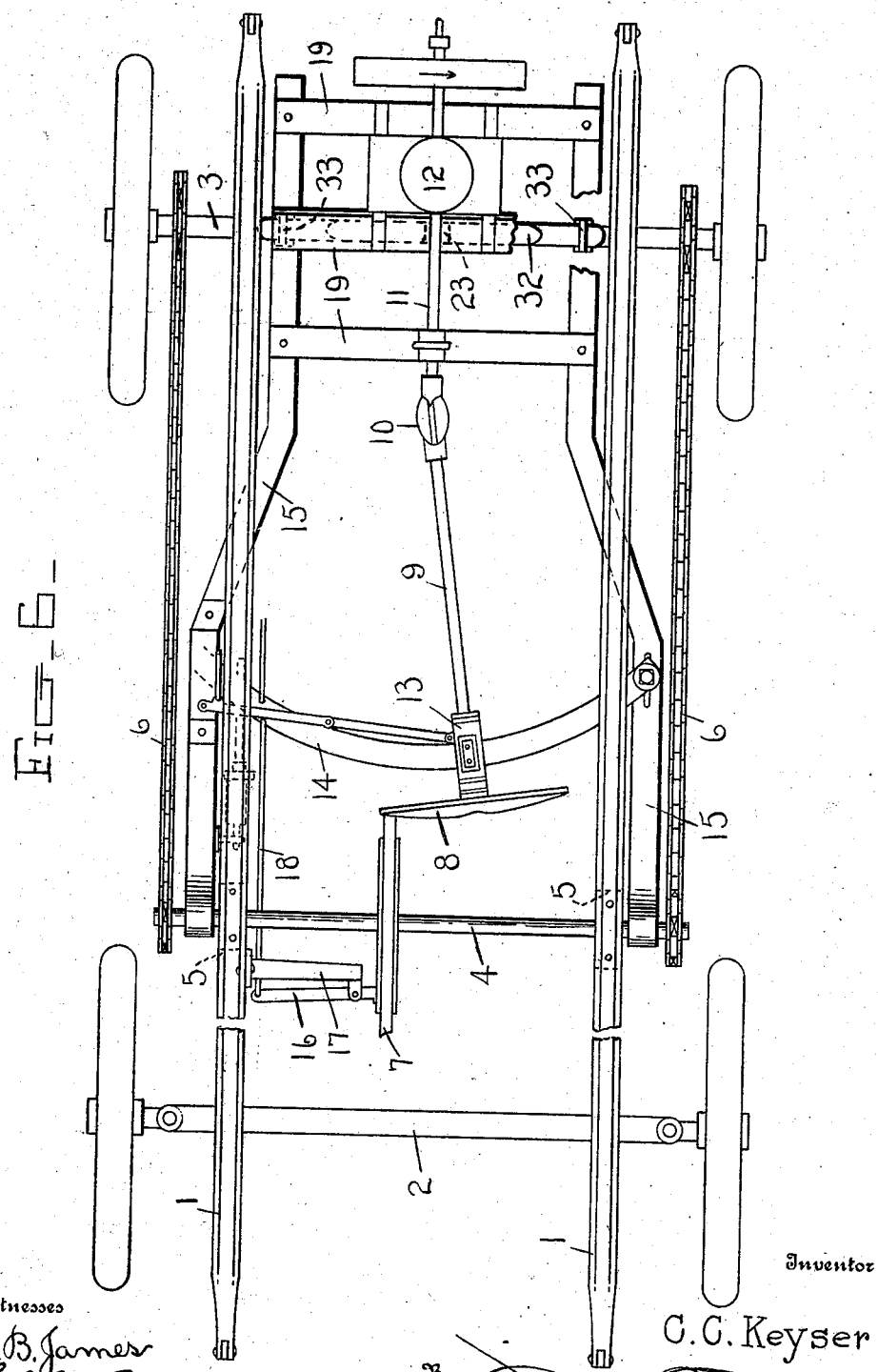
Witnesses
L. B. James
H. C. McCartney
Inventor
C. C. Keyser
By Chandler & Chandler
Attorneys

UNITED STATES PATENT OFFICE.

CHARLES C. KEYSER, OF WASHINGTON, DISTRICT OF COLUMBIA.

AUTOMOBILE RUNNING-GEAR.

No. 881,696.  Specification of Letters Patent.  Patented March 10, 1908.

Application filed December 13, 1907. Serial No. 406,306.

*To all whom it may concern:*

Be it known that I, CHARLES C. KEYSER, a citizen of the United States, residing at Washington, in the District of Columbia, have invented certain new and useful Improvements in Automobile Running-Gears; and I do hereby declare the following to be a full, clear, and exact description of the invention, such as will enable others skilled in the art to which it appertains to make and use the same.

The present invention has reference to motor car running gears, and it aims, primarily, to provide a device of that nature which is yieldingly supported in such a manner as to completely absorb all vibrations of the engine during the time that the same is in operation.

To this end, the invention comprises a supplemental frame pivoted at its rear end to the counter-shaft of the car and yieldingly supported at its front end upon an elliptic spring pivoted thereto and to the front axle.

The invention further resides in the particular construction of such frame and its attendant parts, and in the specific means employed for connecting the spring to the frame and to the axle.

These and other features which form the subject matter of this case will be readily understood from a consideration of the following detailed description, and their preferred embodiment is illustrated in the accompanying drawings in which similar parts are designated by corresponding reference numerals in the several views.

Of the said drawings:—Figure 1 is a plan view of the invention applied to a motor car. Fig. 2 is an enlarged fragmental side elevation partly in section. Fig. 3 is a vertical section taken on the line 3—3 of Fig. 2. Figs. 4 and 5 are enlarged detail views of the bracket and sleeve secured to the members of the elliptic spring. Fig. 6 is a plan view showing a modified arrangement of the supplemental frame.

Referring more particularly to the drawings 1 designates the side bars of the main frame or body of the car, 2 and 3 the front and rear axles, and 4 the counter-shaft, which last-mentioned element is supported in brackets 5 bolted to the under face of the side bars. The counter-shaft is connected with the rear axle by a chain and sprocket construction 6 and carries a friction gear 7 driven by a main friction gear 8 which is in turn carried by a swinging shaft 9 and is slidably connected therewith, said shaft being connected by a universal joint 10 with the shaft 11 of the engine 12. The carriage 13 of the main friction gear 8 travels along an arcuate guide 14 which is pivoted at one end to the left-hand side bar 15 of the supplemental frame, the swinging movement of the shaft 9 and the guide 14 being effected by means of operating levers (not shown). The secondary friction gear 7 is adapted to be engaged by the shoe of a brake lever 16 carried by a bracket 17 secured to the right-hand side bar 1, said lever being connected by a link 18 with the guide. The two friction gears and the parts connected therewith, however, form the subject of a separate application filed of even date with this case which application contains a specific description of said parts.

The auxiliary frame which forms the subject of the present case comprises a pair of angle-iron side bars 15 and a series of three cross pieces 19 which connect said bars at their forward ends as shown in Figs. 1 and 2. The side bars 15 are disposed below the plane of the side bars 1 and diverge intermediate their ends from each other, the front portions of said bars being located between the bars 1, and the rear portions exterior thereof, the last-mentioned portions being provided with alining openings through which the projecting ends of the counter-shaft 4 extend, said shaft thus serving as a pivot upon which the frame swings.

Each of the cross pieces 19 which connect the forward ends of the side bars 15 are constructed of angle-iron, and the central cross piece consists of a pair of oppositely-disposed rails or strips of angle-iron whose horizontal arms 20 extend in opposite directions and overlap each other as shown in Fig. 2, thus providing a chamber 21 between the vertical portions or arms 22 and 22' of said rails or strips. Within the central portion of this chamber is disposed the vertical shoulder portion 23 of a bracket 24 whose lower portion is bolted to the upper member of an elliptic spring 25 as shown in Fig. 3, the lower member of said spring being bolted to a similar bracket 26 disposed directly beneath the first-mentioned bracket, the shoulder portion of the bracket 26 fitting between a pair of spaced ears 27 formed on a sleeve 28, said sleeve being provided with a horizontal bore through which the front axle 2 extends. The overlapping portions 20 of the members of the central cross pieces are riveted together, while the vertical portions of said members are provided with openings which register with an opening formed through the shoulder portion of the bracket 24; a pivot bolt 29 passing through said openings. The ears 27 of the sleeve 28 are likewise provided with openings which register with an opening in the shoulder portion of the bracket 26 and thus provide a passage for the pivot bolt 30, by reason of which construction it will be apparent that the axle is capable of a slight swinging or pivotal movement relative to the spring. The auxiliary frame is thus maintained approximately horizontal at all times and there is therefore no distortion of this frame consequent upon the travel of the car over uneven roads, or upon the passage of the wheels over stones or through depressions in the road. The engine 12 which in the present instance is disposed between the front and central cross pieces is likewise maintained horizontal at all times, and its vibrations are completely absorbed by the elliptic spring which forms a support for the forward portion of the auxiliary frame. It is understood that the engine may be disposed between the rear and central cross pieces if preferred. The side bars 1 of the main frame of the car carry the usual bowed springs 31 which are secured at opposite ends thereto and are connected by clips with the ends of the front axle.

By reason of the particular construction of the auxiliary frame and the particular manner in which said frame is supported, as above described, it will be apparent that there is no danger of said frame becoming distorted during the travel of the car over rough roads, and it will be further apparent that the vibrations of the engine during the time that the latter is running will be absorbed to a great extent.

While the auxiliary frame preferably extends forwardly of the car and has its free end yieldingly supported above the front axle, it is to be understood that such disposition may be reversed, as shown in Fig. 6, in which instance the frame extends rearwardly of the car and has its free end supported above the back axle by means of a semi-elliptic or bowed spring 32 the ends of which are secured by shackles 33 to the axle. The engine, in this instance, is mounted above the rear axle, as shown.

What is claimed is:—

1. The combination, with the side-bars and front and rear axles of a motor car, of a counter-shaft journaled in the side-bars; a frame pivoted at one end to the counter-shaft; a spring interposed between the free end of the frame and the adjacent axle; and an engine mounted upon the free end of the frame.

2. The combination, with the side-bars and front and rear axles of a motor car, of a counter-shaft journaled in the side-bars; a frame pivoted at one end to the counter shaft; a spring interposed between the free end of the frame and the adjacent axle and pivoted to the latter and to the frame; and an engine mounted upon the free end of the frame.

3. The combination, with the side-bars and front and rear axles of a motor car, of a counter shaft journaled in the side-bars; a frame pivoted at one end to the counter-shaft; an elliptic spring interposed between the free end of the frame and the adjacent axle, one member of the spring being pivotally connected with said axle and the other member with said frame; and an engine mounted upon the free end of the frame.

4. The combination, with the side-bars and front and rear axles of a motor car, of a counter-shaft journaled in the side-bars; a frame comprising a pair of spaced bars pivoted at one end to the counter-shaft, and a series of spaced cross-pieces connecting the free ends of said bars; a spring interposed between said cross-pieces and the adjacent axle and pivotally connected with the cross-pieces and with said axle; and an engine mounted upon said cross-pieces.

5. The combination, with the side-bars and front and rear axles of a motor car, of a counter-shaft journaled in the side-bars; a frame comprising a pair of spaced bars pivoted at one end to the counter-shaft, and a series of spaced cross-pieces connecting the free ends of said bars; an elliptic spring interposed between said cross-pieces and the adjacent axle; a sleeve secured to said axle; a bracket secured to each member of the spring intermediate the ends thereof, one bracket being pivoted to said sleeve and the other bracket to the adjacent cross-piece; and an engine mounted upon said cross-pieces.

6. The combination, with the side-bars and front and rear axles of a motor car, of a counter-shaft journaled in the side-bars; a frame comprising a pair of spaced bars pivoted at one end to the counter-shaft, and a series of spaced cross-pieces connecting the free ends of said bars, one of said cross pieces comprising a pair of spaced members provided with laterally-projecting portions overlapping each other; a spring interposed between said cross-pieces and the adjacent axle, and pivotally connected with the latter; a bracket carried by said spring and having a portion thereof fitting in the space between and pivoted to the members of said cross-piece; and an engine mounted upon the said cross pieces.

In testimony whereof, I affix my signature, in presence of two witnesses.

CHARLES C. KEYSER.

Witnesses:
    H. C. MCCARTENEY,
    GEO. H. CHANDLEE.